US009026456B2

(12) United States Patent
Choi et al.

(10) Patent No.: US 9,026,456 B2
(45) Date of Patent: May 5, 2015

(54) BUSINESS-RESPONSIBILITY-CENTRIC IDENTITY MANAGEMENT

(75) Inventors: Chul Choi, Thornhill (CA); Balasubramanyam Ganaparthi, Irving, TX (US)

(73) Assignee: Oracle International Corporation, Redwood Shores, CA (US)

( * ) Notice: Subject to any disclaimer, the term of this patent is extended or adjusted under 35 U.S.C. 154(b) by 1576 days.

(21) Appl. No.: 12/355,403

(22) Filed: Jan. 16, 2009

(65) Prior Publication Data

US 2010/0185451 A1    Jul. 22, 2010

(51) Int. Cl.
| G06Q 10/00 | (2012.01) |
| G06Q 10/10 | (2012.01) |
| G06F 21/62 | (2013.01) |
| G06F 21/60 | (2013.01) |
| H04L 29/06 | (2006.01) |

(52) U.S. Cl.
CPC .............. *G06Q 10/10* (2013.01); *G06F 21/62* (2013.01); *G06F 21/604* (2013.01); *H04L 63/10* (2013.01); *H04L 63/105* (2013.01); *H04L 63/0815* (2013.01)

(58) Field of Classification Search
USPC .................................... 705/7.11; 726/2–8, 27
See application file for complete search history.

(56) References Cited

U.S. PATENT DOCUMENTS

| 5,761,513 | A * | 6/1998 | Yellin et al. .................... 717/127 |
| 6,947,989 | B2 * | 9/2005 | Gullotta et al. ................ 709/226 |
| 7,099,947 | B1 * | 8/2006 | Nadeau et al. ................. 709/229 |
| 7,185,192 | B1 * | 2/2007 | Kahn ............................. 713/155 |
| 7,318,237 | B2 * | 1/2008 | Moriconi et al. ................ 726/27 |
| 7,340,469 | B1 * | 3/2008 | Alghathbar et al. .................. 1/1 |
| 7,644,008 | B1 * | 1/2010 | Issa et al. ..................... 705/7.11 |
| 7,941,336 | B1 * | 5/2011 | Robin-Jan .................... 705/7.13 |
| 2002/0083012 | A1 * | 6/2002 | Bush et al. ....................... 705/76 |
| 2004/0088357 | A1 * | 5/2004 | Harding ........................ 709/206 |
| 2005/0198121 | A1 * | 9/2005 | Daniels et al. ................ 709/203 |
| 2007/0266006 | A1 * | 11/2007 | Buss ................................. 707/3 |
| 2008/0016580 | A1 * | 1/2008 | Dixit et al. ...................... 726/27 |
| 2008/0021716 | A1 * | 1/2008 | Buss et al. ........................ 705/1 |
| 2008/0086473 | A1 * | 4/2008 | Searl et al. ....................... 707/9 |
| 2008/0098485 | A1 * | 4/2008 | Chiou ............................. 726/27 |
| 2008/0154919 | A1 * | 6/2008 | Barlen et al. .................. 707/100 |
| 2008/0243524 | A1 * | 10/2008 | Agrawal et al. ................... 705/1 |
| 2009/0076865 | A1 * | 3/2009 | Rousselle et al. ................. 705/7 |

(Continued)

OTHER PUBLICATIONS

White et. al. "How Computers Work", Que, Oct. 15, 2003, 7th Edition.*

*Primary Examiner* — Steven Kim
(74) *Attorney, Agent, or Firm* — Shun Yao; Park, Vaughan, Fleming & Dowler LLP

(57) ABSTRACT

One embodiment of the present invention provides a system for managing business responsibilities. During operation, the system receives a user request for a business responsibility and forwards the request to a managing entity, thereby allowing the managing entity to approve or deny the request. If the managing entity approves the user's request, the system identifies one or more resources corresponding to the requested business responsibility, and provisions the credentials required to access the identified resources, thereby allowing the user to access the business responsibility without managing the required credentials. The system further notifies the user that the requested business responsibility is accessible. If the managing entity denies the user's request, the system notifies the user that the request is denied.

14 Claims, 4 Drawing Sheets

(56) References Cited

U.S. PATENT DOCUMENTS

2009/0133115 A1* 5/2009 Heninger et al. ............. 726/15
2009/0150981 A1* 6/2009 Amies et al. ................. 726/5
2009/0164988 A1* 6/2009 Gupta et al. ................ 717/170
2009/0249440 A1* 10/2009 Platt et al. .................... 726/1
2010/0107214 A1* 4/2010 Ganz ............................ 726/1

* cited by examiner

BUSINESS-RESPONSIBILITY-CENTRIC IDENTITY MANAGEMENT

BACKGROUND

1. Field of the Invention

The present disclosure relates to identity management systems. More specifically, the present disclosure relates to a business-responsibility-centric identity management system.

2. Related Art

Most currently available identity management (IdM) systems are being provisioned at the information technology (IT) resource level. IT resource is a representation of target systems, such as software applications and computer systems, which are being provisioned by an IdM system for user access. As a result, the IdM system can provide information on a user's access to the IT resource. However, current IdM systems do not provide detailed information on a user's business responsibilities.

At present, most legislation and regulatory requirements, such as the Sarbanes-Oxley Act (SOX), the Health Insurance Portability and Accountability Act (HIPAA), and the Statement on Auditing Standards No. 70: Service Organizations (SAS70), are concerned with specific business responsibilities a user has instead of the user's access to IT resources.

In addition, it is sometimes difficult to determine which business responsibility is granted to a user if the IdM system manages the user's identity and access at the system level. In other words, even when one knows which groups, roles, or functions on a specific system a user has access to, there is no way to identify which business responsibility the user is able to perform. Traditionally, in order to comply with the legislation and regulatory requirements, manual effort and additional data processing based on information lookup are often needed.

SUMMARY

One embodiment of the present invention provides a system for managing business responsibilities. During operation, the system receives a user request for a business responsibility and forwards the request to an identity managing entity, thereby allowing the managing entity to approve or deny the request. If the managing entity approves the user's request, the system identifies one or more resources corresponding to the requested business responsibility, and provisions the credentials required to access the identified resources, thereby allowing the user to access the business responsibility without managing the required credentials. The system further notifies the user that the requested business responsibility is accessible. If the managing entity denies the user's request, the system notifies the user that the request is denied.

In a variation on this embodiment, the managing entity approves or denies a user's request for accessing a business responsibility based on legislation and regulatory requirements.

In a variation on this embodiment, the system determines whether the request violates separation of duties (SoD) requirements.

In a variation on this embodiment, the system presents the user a web-based user interface for requesting access to the business responsibility.

In a variation on this embodiment, the system retrieves credentials required to access the identified resources, and provides user access to the identified resources using retrieved credentials.

In a variation on this embodiment, the system creates an account for the user to access the identified resources if the user does not have credentials to access the resources.

In a variation on this embodiment, at least one of the identified resources includes an application for running a virtual private network (VPN).

In a variation on this embodiment, at least one of the identified resources includes an application for running an enterprise resource planning (ERP) system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Embodiments of the present invention provide a method and system for identity management. The system individually manages each business responsibility and then aggregates the business responsibilities of a user to determine the corresponding systems and/or resources to be provisioned. By individually managing business responsibilities, the system meets legislative and regulatory requirements. In addition, this solution can enforce separation of duties (SoD).

Figure 1:
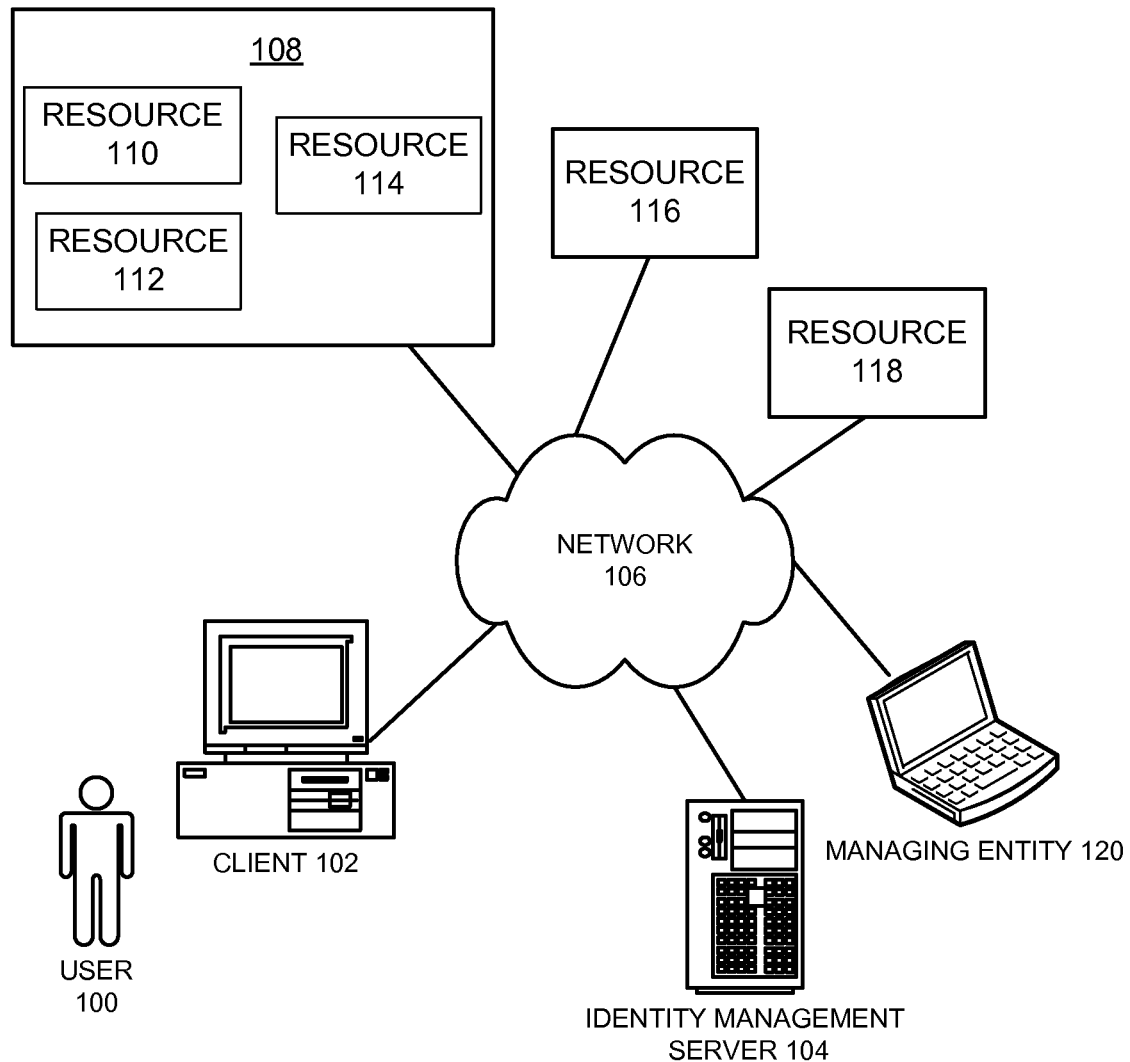
FIG. 1 presents a block diagram illustrating an identity management system in accordance with an embodiment of the present invention.

FIG. 1 presents a block diagram illustrating an identity management system in accordance with an embodiment of the present invention. A user 100 is in communication with one or more computer systems via a network 106 and a client 102. Also coupled to network 106 are an identity management server 104, a number of resources 108-118, and a managing entity 120.

During operation, user 100 can request to a business responsibility, which includes, but is not limited to: privileges to access certain business data files and abilities to execute certain business functionalities. Managing entity 120 approves or denies a user's request for a business responsibility. For example, corporation purchasing includes various business responsibilities such as sending purchase order, receiving purchased goods, receiving and reviewing an invoice, and writing and signing a check. To perform a business responsibility, a user needs to access certain resources. A user, such as a purchasing manager or a chief financial officer (CFO), may have a number of business responsibilities. Managing entity 120 can be the user's manager, or a software application that is configured to approve the user's business responsibility request based on a set of predetermined rules. Note that different embodiments of the present invention may use different configurations, and are not limited to the configuration illustrated in FIG. 1.

User 100 may correspond to: an individual; a group of individuals; an organization; a group of organizations; a computing system; a group of computing systems; or any other entity that includes functionality to access client 102.

Client 102 may represent a node on network 106 with computational capability and mechanisms for communicating across the network. For example, client 102 may correspond to a personal computer (PC), a laptop computer, workstation, and/or other electronic computing device with network connectivity. Furthermore, client 102 may couple to network 106 using wired and/or wireless connections.

Similarly, identity management server 104 may correspond to a node that includes functionality to service requests from client 102 for identity management. For example, server 104 may receive and grant client 102's request for access to a business responsibility, and provision resources 108-118 according to the requested business responsibility. Server 104 may be a computing cluster, or a stand-alone server.

Network 106 may correspond to any type of wired or wireless communication channels capable of coupling together computing nodes (e.g., client 102, identity management server 104, and systems 108-118). This includes, but is not limited to, a local area network (LAN), a wide area network (WAN), an enterprise's intranet, a virtual private network (VPN), and/or a combination of networks. In one or more embodiments of the present invention, network 106 includes the Internet. Network 106 may also include phone and cellular phone networks, such as Global Systems for Mobile communications (GSM) networks.

Resources 108-118 can include software modules/systems, such as resources 110-114, and computer systems, such as resources 108, 116, and 118. Examples of software modules can include a database, applications for an enterprise resource planning (ERP) system, applications for virtual private network (VPN), etc. Computer systems can generally include any type of computer system based on a microprocessor, a mainframe computer, a digital signal processor, a portable computing device, a personal organizer, a device controller, or a computational engine within an appliance. Resources 108-118 can be either individual systems coupled to network 106, such as resources 116 and 118, or a collection of systems residing on a single system, such as resources 110-114 residing on resource 108, which is a computer system.

Figure 2:
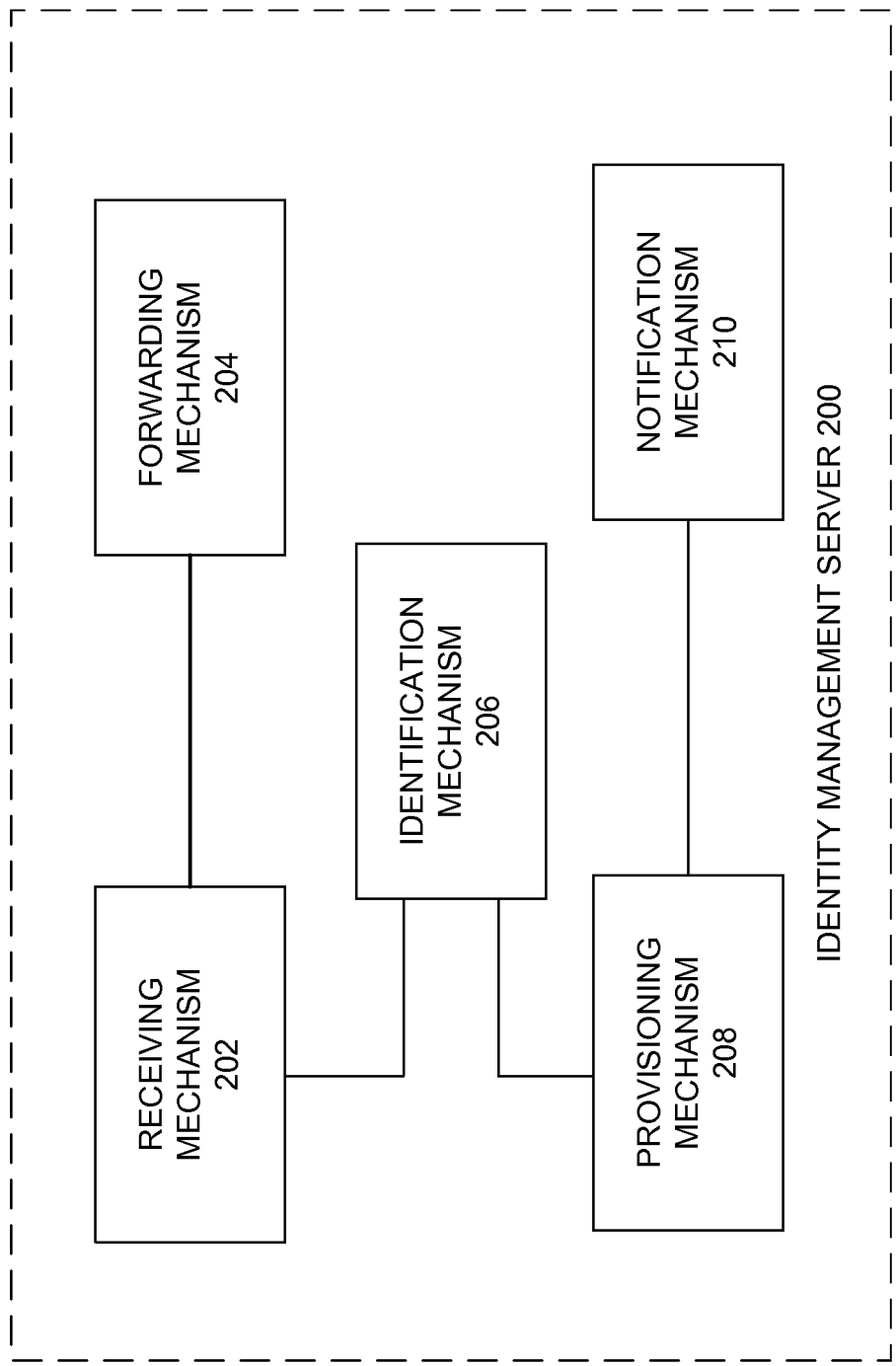
FIG. 2 presents an exemplary block diagram illustrating an identity management server in accordance with an embodiment of the present invention

FIG. 2 presents an exemplary block diagram illustrating an identity management server in accordance with one embodiment of the present invention. As shown in FIG. 2, an identity management server 200 includes a receiving mechanism 202, a forwarding mechanism 204, an identification mechanism 206, a provisioning mechanism 208, and a notification mechanism 210. Receiving mechanism 202 receives a user's request to access a business responsibility. Forwarding mechanism 204 forwards the user's request to a managing entity for approval. Upon the managing entity's approval, identification mechanism 206 identifies resources involved for the requested business responsibility. In one embodiment, identification mechanism 206 maintains a mapping table that maps business responsibilities with corresponding resources. Subsequently, provisioning mechanism 208 provisions involved resources to the user, and notification mechanism 210 notifies the user the availability of the requested business responsibility.

Figure 3:
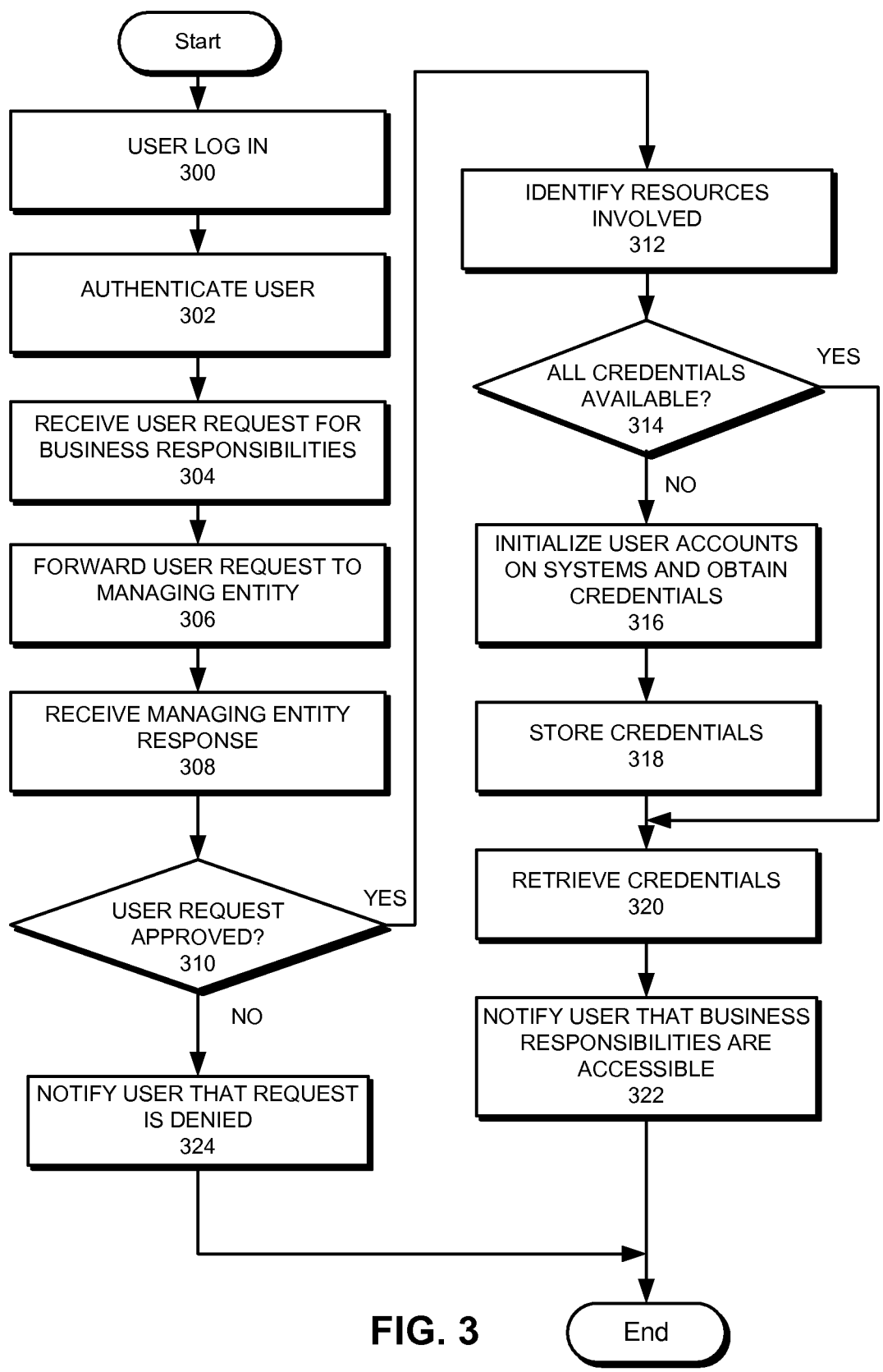
FIG. 3 presents a flowchart illustrating the process of granting a user a business responsibility in accordance with an embodiment of the present invention.

FIG. 3 presents a flowchart illustrating the process of granting a users a business responsibility in accordance with an embodiment of the present invention. During operation, a user logs into the IdM system (operation 300) and is authenticated (operation 302). In one embodiment, a standard login and authentication process, such as using a user ID and a password, is applied. The IdM system receives a request from the user for a business responsibility (operation 304) and forwards the request to a managing entity for approval (operation 306). In one embodiment, the IdM system presents the user with a web-based user interface to allow the user to submit business-responsibility request. In another embodiment, a user can request business responsibilities via email.

Subsequent to forwarding the user's request, the IdM system receives a response from the managing entity (operation 308) and determines whether the user request is approved (operation 310). In one embodiment, the managing entity approves or denies a user's request for a business responsibility based on legislation or regulatory requirements. In addition, the managing entity may approve or deny a user's request based on the requirement for separation of duties (SoD). For example, if a user has been granted a business responsibility for receiving a payment on a business account, when the user requests the business responsibility for approving a write-off on the same account, which if granted violates the SoD requirement, the managing entity denies the user's request. The IdM system can also automatically determine whether the user's request for a business responsibility violates SoD based on the user's ID and the requested business responsibility. The IdM system may keep a record of business responsibilities granted to each user. In one embodiment, the IdM system alerts the managing entity for possible SoD violations. In a further embodiment, the IdM system prevents a user from performing a business responsibility if the IdM system detects an SoD violation.

If the managing entity denies the user's request, the IdM system notifies the user that the request is denied (operation 324). If the managing entity approves the user's request for the business responsibility, the IdM system retrieves objects associated with the business responsibility, which identify resources corresponding to the business responsibility (operation 312). Subsequently, the IdM system determines whether the user has credentials to access the corresponding systems (operation 314). If the user does not have credentials needed to access the corresponding systems, the IdM system initializes a user account on the corresponding resource and obtains credentials for the user (operation 316). The IdM system stores the obtained credentials for future use (operation 318). The user credentials may include user IDs and passwords. The user credentials may also specify the access privileges on the corresponding resource granted to the user based on the necessity of performing the business responsibility.

Because the IdM system automatically provisions the user with credentials to access the corresponding resource, the user is freed from having to manage those credentials. As a result, a user can access the requested business responsibility without the need of directly managing associated user credentials. Consider a scenario in which a user is granted various business responsibilities which involve tens of resources. Conventionally, a user needs to manage tens of credentials, which are cumbersome to the user. Provisioning credentials to user automatically, the IdM system improves user efficiency for managing business responsibilities. If the IdM system determines that the user already has sufficient credentials to access the corresponding systems, the IdM system retrieves the user credentials (operation 320). The IdM system then notifies the user that the business responsibility request is granted and the user can start performing the requested business responsibilities (operation 322).

Compared with traditional identity management systems which manage each system's access by assigning user roles, embodiments of the present invention manage and provision each business responsibility which is represented by an object. Although the number of managed objects might be large because the number of business responsibilities may be hundreds, or even thousands, the addition and deletion of a business responsibility becomes rather straightforward. In addition, embodiments of the present invention provide a solution to meet the proliferation of legislative and regulatory requirements for determining and managing the business responsibilities of a user.

Figure 4:
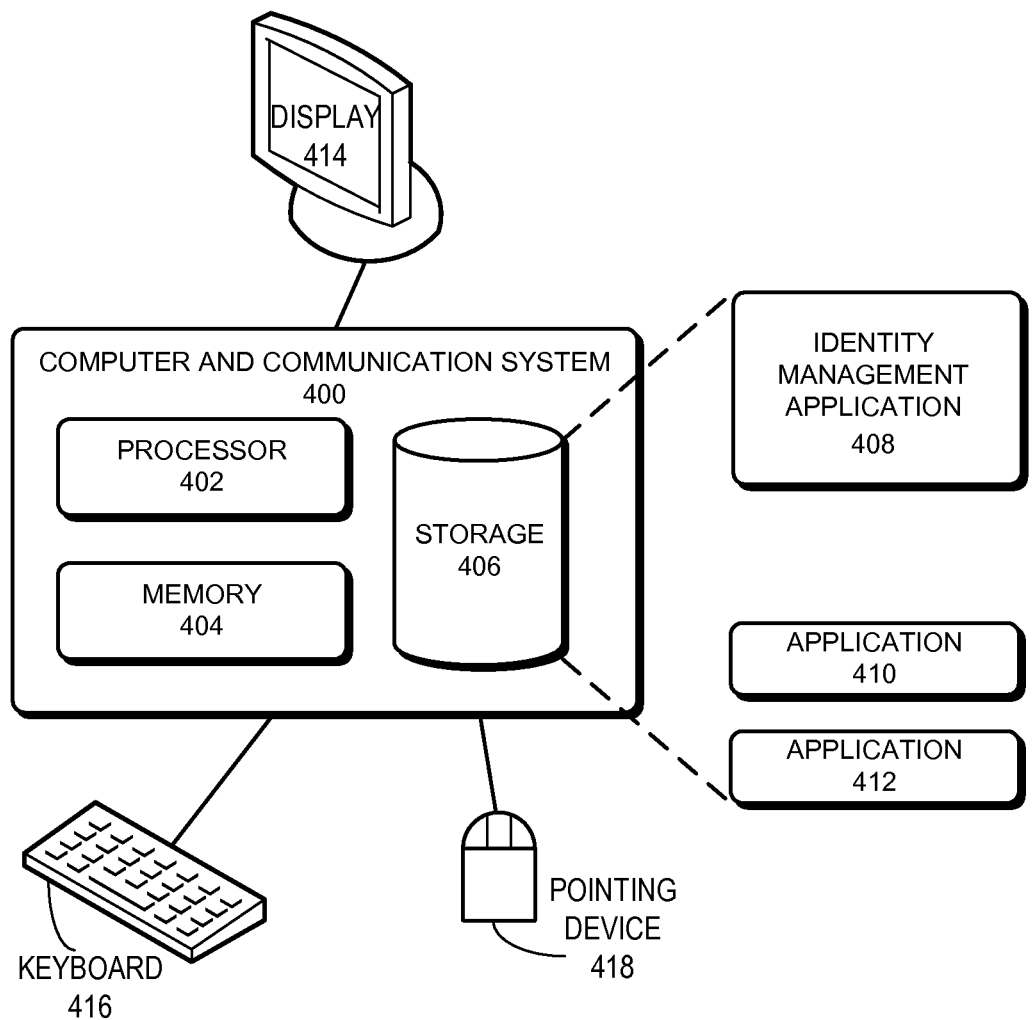
FIG. 4 illustrates an exemplary computing system of identity management in accordance with an embodiment of the present invention.

FIG. 4 illustrates an exemplary computer system for identity management in accordance with one embodiment of the present invention. In one embodiment, a computer and communication system 400 includes a processor 402, a memory 404, and a storage device 406. Storage device 406 stores an identity management application 408, as well as other applications, such as applications 410 and 412. During operation, identity management application 408 is loaded from storage device 406 into memory 404 and then executed by processor 402. While executing the program, processor 402 performs the aforementioned functions. Computer and communication system 400 is coupled to an optional display 414, keyboard 416, and pointing device 418.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing business responsibilities, comprising:

receiving, by an identity management server, a first credential from a user;

authenticating, by the identity management server, the user based on the first credential;

receiving, at the identity management server, a request from the user to perform a business responsibility specified by a legislative or regulatory requirement;

determining, by the identity management server, whether the request violates the legislative or regulatory requirement;

forwarding, by the identity management server, the request and an outcome of the determination to a managing entity server, which approves or denies the request based at least on the request and the determination outcome;

receiving, by the identity management server, an approval response from the managing entity server;

in response to receiving, by the identity management server, the approval response from the managing entity server for the request:

identifying, by the identity management server, a resource corresponding to the business responsibility; and provisioning, by the identity management server, a second credential required to access the identified resource to the user, and freeing the user from the need of managing the required second credential, wherein the provisioning the credential includes:

determining, by the identity management server, that the user does not have the second credential to access the identified resource;

in response to the user not having the second credential to access the identified resource, automatically creating, by the identity management server, an account and the second credential for the user on the identified resource; and storing, by the identity management server, the second credential in a storage, wherein the second credential is automatically retrieved from the storage and used by the identity management server in authorizing the user with access to the identified resource after receiving a subsequent request for the business responsibility from the user;

obtaining, by the identity management server, the second credential for the user from the storage;

notifying, by the identity management server, the user that the business responsibility is ready to be performed; and providing, by the identity management server, to the user access to the identified resource using the second credential.

2. The method of claim 1, wherein the step of determining whether the request violates the legislative or regulatory requirement further comprising determining whether the request violates separation of duties (SOD) requirements in relation to a different business responsibility previously granted to the user.

3. The method of claim 1, further comprising presenting the user with a web-based user interface to request the business responsibility.

4. The method of claim 1, wherein the identified resource includes an application for running a virtual private network (VPN).

5. The method of claim 1, wherein the identified resource includes an application for running an enterprise resource planning (ERP) system.

6. A non-transitory computer-readable storage medium storing instructions which, when executed by a computer, cause the computer to perform a method for managing business responsibilities, the method comprising:

receiving, by a computer, a first credential from a user;
authenticating, by the computer, the user based on the first credential;
receiving, at the computer, a request from the user to perform a business responsibility specified by a legislative or regulatory requirement;
determining, by the computer, whether the request violates the legislative or regulatory requirement;
forwarding, by the computer, the request and an outcome of the determination to a managing entity server, which approves or denies the request based at least on the request and the determination outcome;
receiving, by the computer, an approval response from the managing entity server;
in response to receiving, by the computer, the approval response from the managing entity server for the request:
identifying, by the computer, a resource corresponding to the business responsibility; and
provisioning, by the computer, a second credential required to access the identified resource to the user, and freeing the user from the need of managing the required second credential, wherein the provisioning the credential includes:
determining, by the computer, that the user does not have the second credential to access the identified resource;
in response to the user not having the second credential to access the identified resource, automatically creating, by the computer, an account and the second credential for the user on the identified resource; and
storing, by the computer, the second credential in a storage, wherein the second credential is automatically retrieved from the storage and used by the computer in authorizing the user with access to the identified resource after receiving a subsequent request for the business responsibility from the user;
obtaining, by the computer, the second credential for the user from the storage;
notifying, by the computer, the user that the business responsibility is ready to be performed; and
providing, by the computer, to the user access to the identified resource using the second credential.

7. The computer-readable storage medium of claim 6, wherein the step of determining whether the request violates the legislative or regulatory requirement further comprises determining whether the request violates separation of duties (SOD) requirements in relation to a different business responsibility previously granted to the user.

8. The computer-readable storage medium of claim 6, wherein the method further comprises presenting the user with a web-based user interface for requesting the business responsibility.

9. The computer-readable storage medium of claim 6, wherein the identified resource includes an application for running a virtual private network (VPN).

10. The computer-readable storage medium of claim 6, wherein the identified resource includes an application for running an enterprise resource planning (ERP) system.

11. A computer system for managing business responsibilities, the system comprising:
a processor; and
a memory coupled to the processor, wherein the memory stores a set of instructions when executed by the processor causes the processor to perform the method comprising:
receiving a first credential from a user;
authenticating the user based on the first credential;
receiving a request from the user to perform a business responsibility specified by a legislative or regulatory requirement;
determining whether the request violates the legislative or regulatory requirement;
forwarding the request and an outcome of the determination to a managing entity server, which approves or denies the request based at least on the request and the determination outcome;
receiving an approval response from the managing entity server;
in response to receiving the approval response from the managing entity server for the request:
identifying a resource corresponding to the business responsibility; and
provisioning a second credential required to access the identified resource to the user, and freeing the user from the need of managing the required second credential, wherein the provisioning the credential includes:
determining that the user does not have the second credential to access the identified resource;
in response to the user not having the second credential to access the identified resource, automatically creating an account and the second credential for the user on the identified resource; and
storing the second credential in a storage, wherein the second credential is automatically retrieved from the storage and used by the processor in authorizing the user with access to the identified resource after receiving a subsequent request for the business responsibility from the user;
obtaining the second credential for the user from the storage;
notifying the user that the business responsibility is ready to be performed; and
providing to the user access to the identified resource using the second credential.

12. The computer system of claim 11, wherein the method further comprises presenting the user with a web-based user interface for requesting the business responsibility.

13. The computer system of claim 11, wherein the identified resource includes an application for running a virtual private network (VPN).

14. The computer system of claim 11, wherein the identified resource includes an application for running an enterprise resource planning (ERP) system.

* * * * *

UNITED STATES PATENT AND TRADEMARK OFFICE
CERTIFICATE OF CORRECTION

| | | |
|---|---|---|
| PATENT NO. | : 9,026,456 B2 | Page 1 of 1 |
| APPLICATION NO. | : 12/355403 | |
| DATED | : May 5, 2015 | |
| INVENTOR(S) | : Chul Choi et al. | |

It is certified that error appears in the above-identified patent and that said Letters Patent is hereby corrected as shown below:

In the Specification
(at column 2, line 19), delete the word "invention" and insert the following in its place: -- invention. --

In the Claims
In claim 2 (at column 6, line 52) delete the term "(SOD)" and replace it with the term -- (SoD) --

In claim 7 (at column 7, line 50) delete the term "(SOD)" and replace it with the term -- (SoD) --

Signed and Sealed this
Nineteenth Day of April, 2016

Michelle K. Lee
*Director of the United States Patent and Trademark Office*